Oct. 31, 1939.  E. J. DUNHAM  2,178,370
INDUSTRIAL TRUCK
Filed June 4, 1938  5 Sheets-Sheet 1

INVENTOR.
Elmer J. Dunham.
BY Walter E. Schirmer
ATTORNEY.

Oct. 31, 1939.   E. J. DUNHAM   2,178,370
INDUSTRIAL TRUCK
Filed June 4, 1938   5 Sheets—Sheet 2

INVENTOR.
Elmer J. Dunham
BY Walter E. Schirmer
ATTORNEY.

Oct. 31, 1939.  E. J. DUNHAM  2,178,370
INDUSTRIAL TRUCK
Filed June 4, 1938   5 Sheets-Sheet 3

INVENTOR.
Elmer J. Dunham
BY Walter E. Schirmer
ATTORNEY.

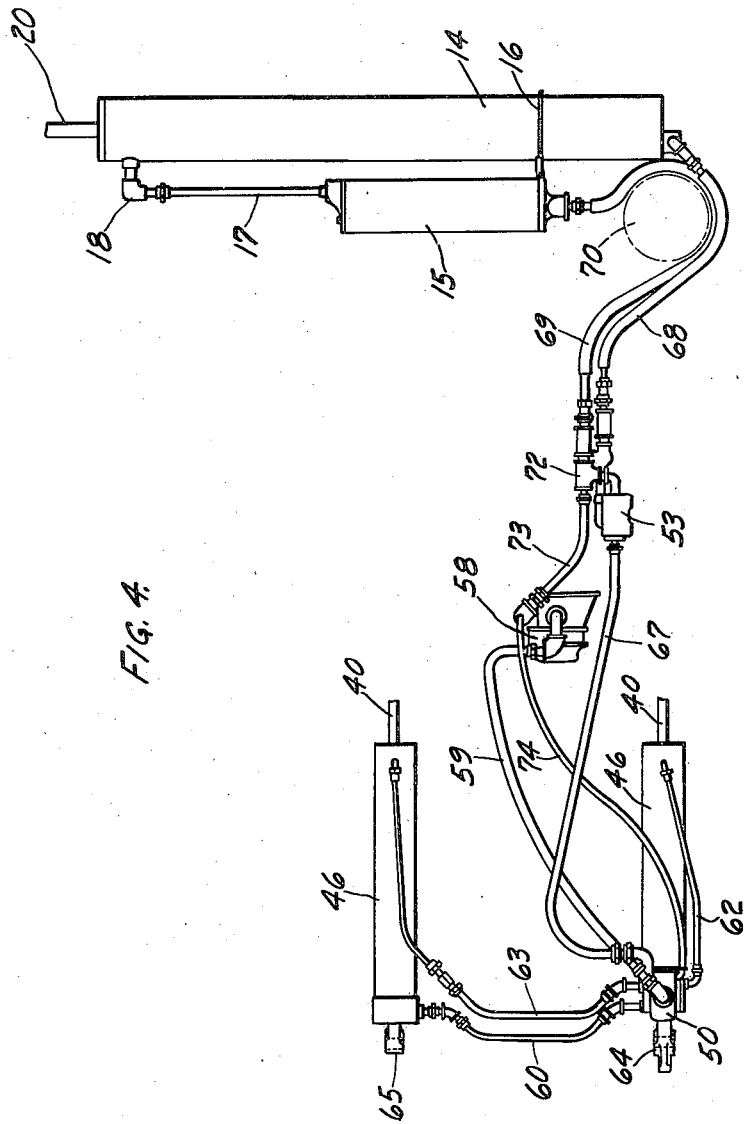

Oct. 31, 1939.  E. J. DUNHAM  2,178,370
INDUSTRIAL TRUCK
Filed June 4, 1938   5 Sheets-Sheet 5
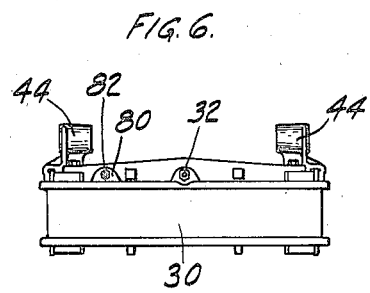
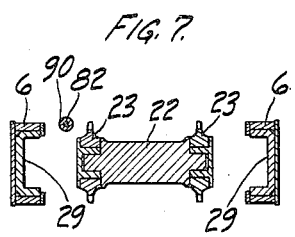
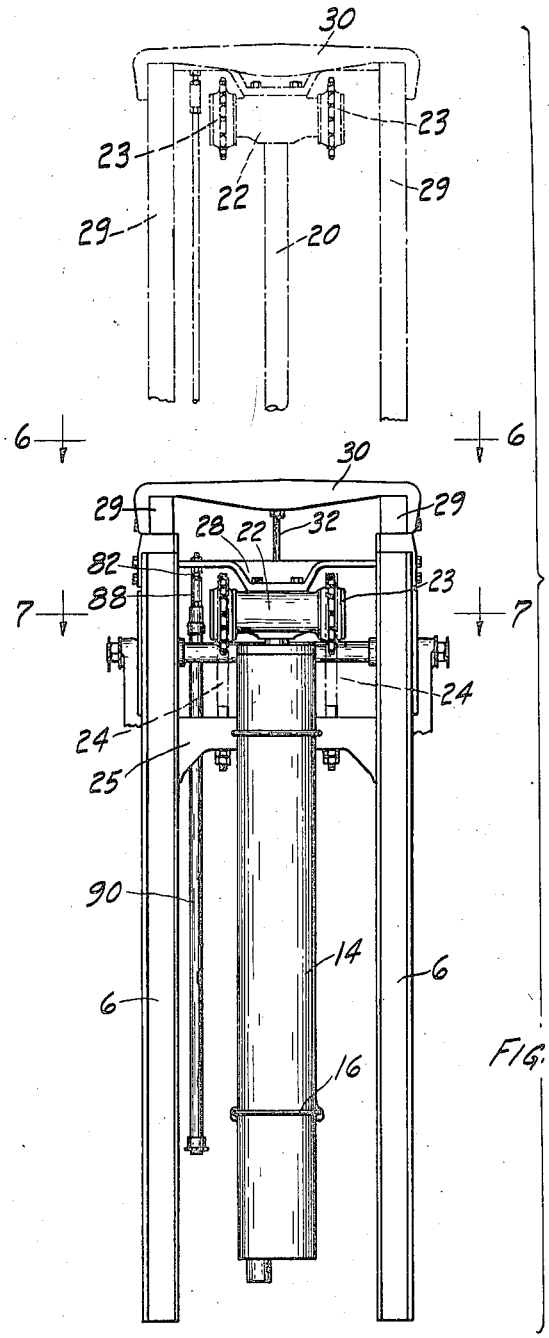
INVENTOR.
Elmer J. Dunham
BY Walter E. Schirmer
ATTORNEY.

Patented Oct. 31, 1939

2,178,370

UNITED STATES PATENT OFFICE 2,178,370

INDUSTRIAL TRUCK

Elmer J. Dunham, Battle Creek, Mich., assignor to Clark Equipment Company, Buchanan, Mich., a corporation of Michigan Application June 4, 1938, Serial No. 211,746

8 Claims. (Cl. 214—113)

This invention relates to industrial trucks, and more particularly is directed to an industrial truck construction adapted for picking up and transporting goods, wares and mechandise, and tiering the same in warehouses, mercantile buildings or the like, the truck having its own source of motive power and being suitably controlled by an operator throughout its various movements.

The present invention is an improvement over previous structures of this type, and has as its particular feature the provision of a telescoping load-lifting mechanism mounted at the forward end of the truck and capable of lifting the load from the floor level to a height such as ordinarily required for storage purposes or for loading box cars or the like.

One of the primary objects of the present invention is to provide a truck of this type having a pair of uprights pivotally supported at the forward end thereof, and within which is guided a second pair of uprights having telescoping movement therein and automatically controlled for lifting purposes by a hydraulically actuated cross head which is connected by suitable means to a load supporting carriage guided on the uprights. The uprights are supported in such manner that they may be tilted either forwardly or rearwardly about their lower pivotal connections to insure control of the load on the carriage and to facilitate movement of the truck about the plant.

Preferably, I employ an internal combustion engine as the motive power for the truck, and also for driving suitable pressure developing means for actuating the hydraulic lifting and tilting mechanisms. This is of distinct advantage as compared to battery operated trucks or the like since substantially constant service is afforded without the necessity of replacing or recharging batteries.

Another feature of the present invention is the provision of means automatically controlled by movement of the load supporting mechanism for preventing the load-supporting carriage moving past its upper or lower limiting positions with the attendant possibilities of damage to the structure or loss of control of the load. This means is independent of the operator and automatically returns the control mechanism to neutral position when the load carriage reaches either of its limiting positions. Similarly, automatically controlled stop means is provided for the tilting control mechanism to limit the tilting mechanism within a safe range as determined by the requirements of the machine.

Another feature involved in the present construction is the provision of an upright and load supporting mechanism which is so attached to the frame of the vehicle or truck that it may be readily removed therefrom and replaced with other types of loading mechanism whereby I can employ a substantially standardized chassis and motor construction for the truck and utilize any suitable load carrying and controlling means which may be demountably attached at the forward end thereof.

Still another feature of the present invention is the provision of a truck of this type in which all of the control mechanism for both operating the truck itself and for controlling movement of the loading and unloading mechanism is disposed adjacent the operator's platform at a point remote from the uprights and loading carriage, whereby any possible slippage of the load or failure of any part of the machine will not endanger the operator. At the same time, the operator may remain on the platform and have complete control and clear vision of all operations of the truck.

Another feature of the present invention is the provision of a hydraulic control system operating from a single pressure developing source whereby both the tilting and raising and lowering mechanism may be simultaneously operated, and either one may be stopped or started without in any manner affecting the operation of the other. This insures that the operator has, at all times, complete control of the load being carried or tiered by the machine, and thus facilitates the speed and skill with which various loads may be handled.

Still another feature of the present invention is the arrangement of the elevating mechanism so that it occupies relatively small additional height over that required for a non-telescopic type of machine when in lowered position, and yet can be extended substantially double the distance to facilitate high tiering or unloading from highly tiered stock. In this connection, I provide a cylinder construction carried by the uprights and rigidly supported thereby, whereby the raising stresses are all directed longitudinally of the elevating mechanism insuring maximum effective power transmission and reducing to a minimum the angular strains which might be caused by eccentric loading.

As a further protection for the operator, the construction is so balanced or counter-weighted as to insure stability of the truck even under the maximum ranges of position of the loads carried thereby. By providing a structure in which the drive mechanism is disposed directly under the load, maximum traction is obtainable and at the same time, the steering mechanism which is disposed adjacent the opposite end of the truck is not under such pressure as to interfere with ease of steering and mobility of the truck in moving into and out of aisles, passageways, doors, freight cars and the like.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 4 is a small diagrammatic view of the hydraulic control means employed in the truck;

Figure 5 is a front elevational view of the upright structure, showing in dotted lines the raised position thereof;

Figure 6 is a sectional view taken substantially on line 6—6 of Figure 5; and

Figure 7 is a sectional view taken substantially on line 7—7 of Figure 5.

Figure 1:
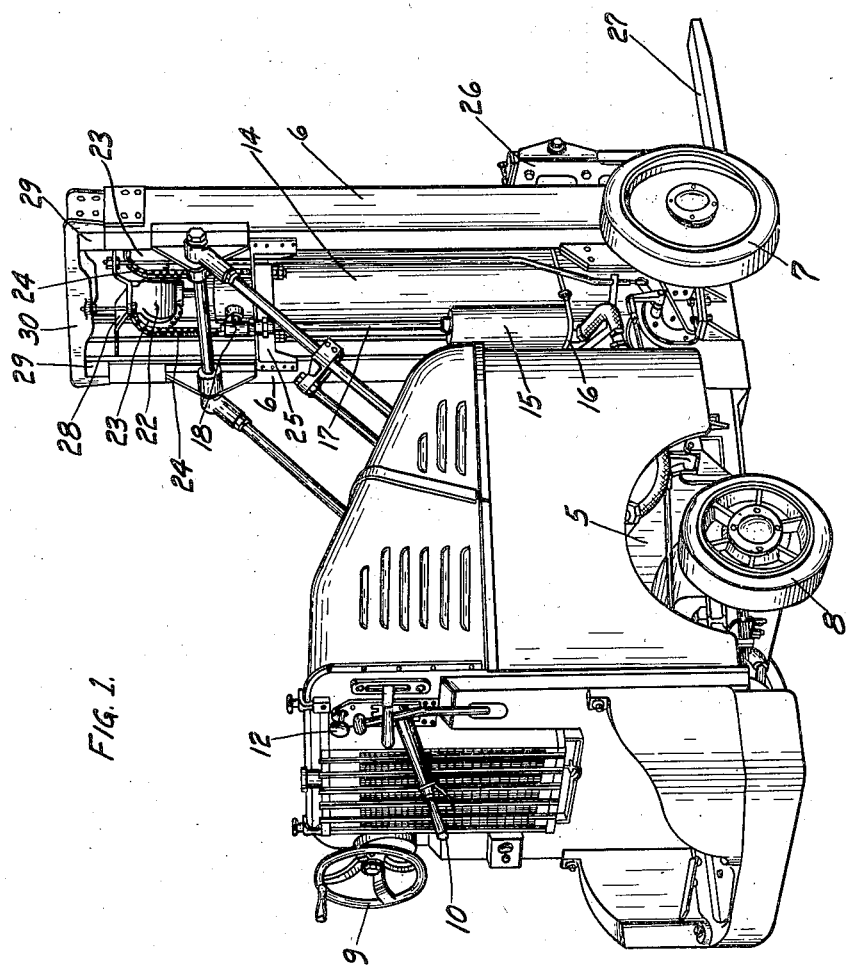
Figure 1 is a perspective view of a truck embodying the present invention with the loading mechanism in lowered position.

Considering now in detail the embodiment of the invention which has been illustrated in the drawings, the chassis of the truck is indicated at 5 and has pivotally mounted at the forward end thereof the laterally spaced channel-shaped uprights 6. Mounted above the chassis 5 at the rear end thereof is a motor or engine, preferably of the internal combustion type which, through suitable transmission mechanism, is adapted to drive the front wheels 7 through an internal gear drive as shown in detail in my copending application, Serial No. 179,273, filed December 11, 1937.

The rear wheels 8 are mounted for dirigible steering movement beneath the arch portion of the frame 5 and are controlled by the hand wheel 9 to any suitable steering reduction.

The details of the instrument controls for driving the vehicle are all as described in connection with said copending application, and it is therefore not believed necessary to discuss the same in detail herein. Suffice it to say, that the engine is controlled through the lever 10 and the gear shift member 12 to provide for varying forward and rear driving speeds through the wheels 7.

Mounted between the uprights 6 and supported at its lower end therebetween is a hydraulic cylinder 14 which has secured to the rear thereof a reservoir 15 by means of the straps 16 or the like. The reservoir 15 has a vertically extending pipe or outlet conduit 17 which communicates through the T connection 18 with the top of the cylinder. Mounted in the cylinder 14 is a piston having the extending rod 20 to which is secured a cross-head 22 carrying on opposite sides the sprocket wheels 23 over which chains 24 are trained which are anchored to the rear of the uprights by the anchor bar 25, and at their opposite ends are connected to the load supporting platform 26 having the forwardly extending fingers 27.

Figure 2:
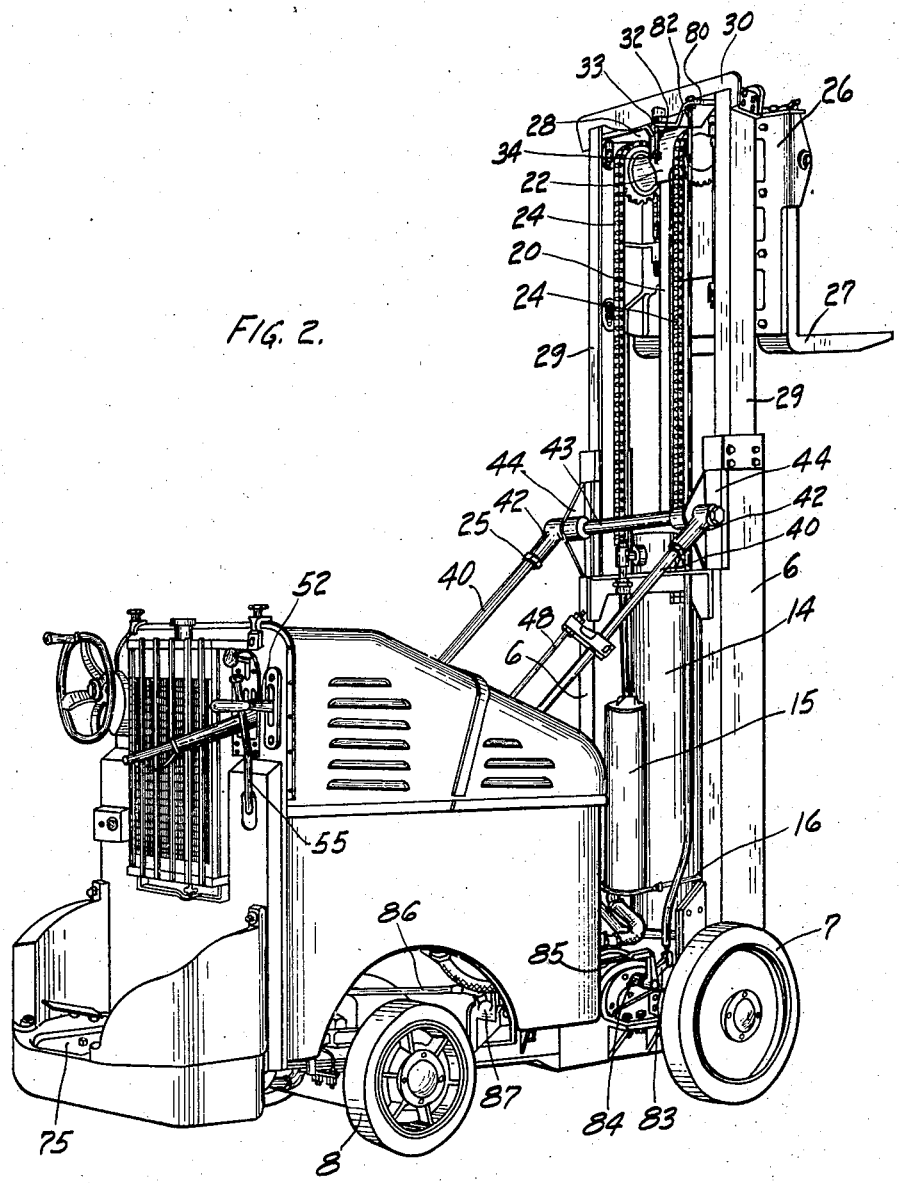
Figure 2 is a similar view showing the mechanism in elevated position.

The cross-head 22 is provided with a flared wing portion 28 which is adapted to engage between the secondary channel-shaped uprights 29 guided within the uprights 6 and telescoping therein for relative longitudinal movement into the position shown in Figure 2. The uprights 29 are connected together at their upper ends by the cross-member 30, and the wing portion 28 of the cross head 22 is adapted to abut beneath the cross member 30 upon admission of fluid under pressure to the bottom of the cylinder 14 to raise the cross head whereby the guides 29 are simultaneously raised therewith. It will be noted that there is a lost motion connection between the wing portion 28 and the member 30 provided by the bolt 32, which, in the position shown in Figure 1, allows the piston head 22 to move downwardly relative to the cross member 30 and therefore provides for upward movement of the cross head 22 a short distance prior to engagement of the wing portion 28 with the member 30 to effect raising of the auxiliary guides 29.

When the mechanism is in the fully raised position as indicated in Figure 2, initial release of pressure from the bottom of the cylinder 14 and admission of fluid under pressure to the top of the cylinder from the reservoir 15 results in a downward movement of the piston rod 20 and cross-head 22. However, as soon as the lug portion 33 of the wing member 28 at the top of the cross-head engages the stop nut 34 of the bolt 32, the guides 29 are brought into conjoint downward movement with the cross-head to insure that they will be lowered with the cross-head to effect lowering of the load-supporting carriage 26. This connection prevents any possibility of the cross-head 22 being lowered with the guides 29 binding or othearwise sticking in the guides 6 and then later falling through the height to which they have been raised with possible damage to the mechanism in this manner.

It is also desirable that the entire load may be tilted either forwardly or rearwardly for picking the same up and transporting it to any desired location. For this purpose, the pivotal mounting of the uprights 6 about the axis of the wheels 7 provides for tilting movement which is controlled by a pair of plungers 40 connected to the arms 42 to the rear ends of the uprights 6 by means of the cross bar 43, which is supported in simple brackets 44 bolted to the uprights. The rods 40 are adapted to extend into suitable tilt cylinders 46, as shown in Figure 4, which correspond to the tilt cylinders shown in my copending application, Serial No. 190,714, filed February 16, 1938. The plungers 40 extend into the cylinders 46 and are reciprocated therein by hydraulic pressure to effect tilting of the uprights 6 about their pivots into the dotted line positions shown at A and B in Figure 3. One of the rods 40 is adapted to carry a bracket 47 to which is secured a control member 48 which controls the actuation of a valve 50 carried by the corresponding tilt cylinder to limit the tilting movement of the uprights 6 between the positions A and B.

Figure 3:
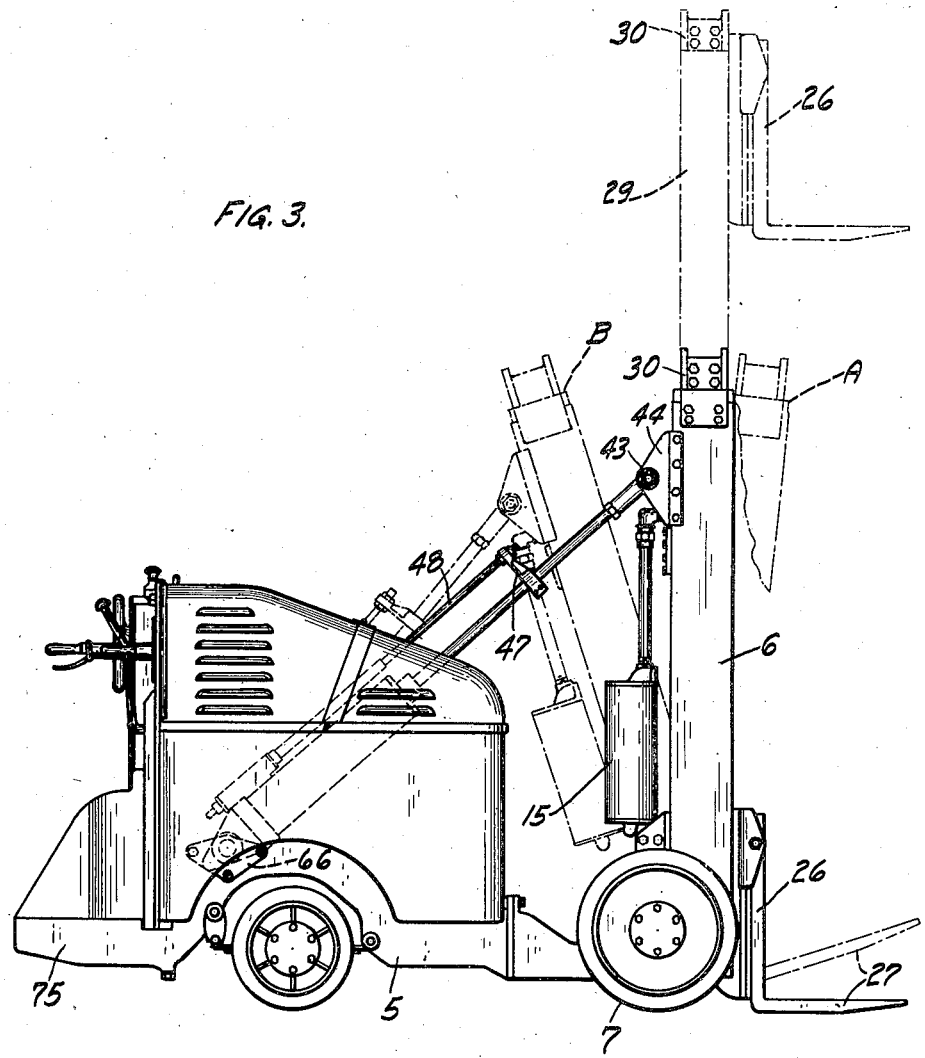
Figure 3 is a side elevational view showing in dotted lines the limits of movement of the uprights upon which the load supporting carriage is mounted.

As will be noted in Figure 3, the load-supporting carriage is thus adapted to be tilted either forwardly or rearwardly, or to be raised in the dotted line position as shown in Figure 3, when the uprights 29 are raised to their uppermost position.

The lever 52 is adapted to control the vertical movement of the uprights 29 by controlling the valve 53 shown in Figure 4 for admitting fluid under pressure selectively to the upper and lower ends of the cylinder 14. The lever 55 in a similar manner, controls the valve 50 for the tilt cylinders to provide for selective admission under pressure thereto.

As diagrammatically shown in Figure 4, the engine of the vehicle is provided with a suitable fluid pressure pump 58 which has its high pressure side connected through the conduit 59 to the valve 50. From the valve 50 the fluid may be selectively admitted to the lower ends of the tilt cylinders 46 through an aperture in the valve 50 directly communicating with the associated cylinder 46 and through the connecting line 60 to the lower end of the opposite end of the cylinder 46. When the valve is shifted to its other limiting position, fluid under pressure is transmitted therefrom through the lines 62 and 63 to the opposite ends of the cylinder for pulling the plungers 40 downwardly to tilt the uprights 6 rearwardly. Each of the cylinders 46 is provided with a rearwardly extending bracket portion 64 and 65, respectively, whereby they may be mounted on suitable trunnions carried by suitable brackets 66 secured to the sides of the frame 5 for pivotal movement about these trunnions to accommodate the angular swinging movement about the plungers 20.

From the valve 50 a suitable high pressure line 67 extends to the valve 53 and from this valve, the fluid under pressure is selectively transmitted through the line 68 to the bottom of the cylinder 14 or through the line 69 to the bottom of the reservoir 15 from whence it passes through the line 17 to the top of the cylinder above the head of the piston rod 20. It will be noted that the lines 68 and 69 comprise flexible tubing, which is disposed about the differential indicated diagrammatically at 70 from which the front wheels 7 are driven. From the valve 53 a suitable T connection 72 is provided which, through the line 73, communicates with the low pressure side of the pump 58, and a suitable exhaust line 74 is also provided from the valve 50 communicating with the low pressure side of the pump.

Inasmuch as the pump 58 supplies fluid under pressure through the lines 59 and 67 to both valves 50 and 53, it will be apparent that the actuating levers 52 and 55 may be selectively actuated independently of each other whereby the load may be raised and simultaneously tilted, lowered and simultaneously tilted, or held in fixed position and tilted, or may be raised and lowered without any tilting action. This provides for accurate control of the load by the operator mounted upon the platform 75, whereby he may guide the load, pick it up, carry it, and tier it in any desired manner. The cross-head 30 for the auxiliary uprights 29 is provided at its rear with the lug portion 80, which is adapted to receive at its upper end the control rod 82 which extends downwardly to a tubular member supported on the anchor bar 25. This tubular member then extends downwardly along the side of the cylinder 14 and at its lower end is connected to a bell crank arm 83 pivotally mounted on the support 84. This bell crank arm is connected through the rod 85 with a second control member 86 also pivotally mounted on the support 87. The member 86 is connected in a manner not shown with the lever 52 substantially as described in my copending application aforesaid, whereby when the uprights 29 reach their upper limiting position the bell crank 83 is rotated in a counter-clockwise direction to return the lever 52 to neutral position, thus locking the piston head 22 in raised position due to the lever 52 moving the valve 53 to neutral position. Similarly, when the cross head is lowered, and through the connection 32 effects simultaneous lowering of the telescoping uprights 29 as these uprights reach their lowermost position, a suitable extension or abutment 88 on the rod 82 moves the tube 90 downwardly to effect clockwise rotation of the arm 83, and thus again returns the lever 52 to neutral position. The operator of course can manually return the lever 52 to neutral position at any intermediate point in order to hold the load-supporting carriage at any intermediate raised position. The control rod 48 functions in a similar manner as described in my aforesaid copending application to return the lever 55 to neutral position when the uprights 6 reach either of their limiting tilted positions as indicated at A and B.

It is therefore believed apparent that I have provided a telescopic tilting type industrial truck which may be used for tiering goods and merchandise, and for transporting the same either to a tiering location or from a tiered position to a point of disposal.

I am aware that a number of changes may be made in certain details of construction disclosed in the present application, and I therefore do not intend to be limited except as defined by the scope and spirit of the appended claims.

I claim:

1. In an industrial truck having a frame provided with driving wheels at one end thereof, a pair of vertically extending uprights pivotally supported at said end of said frame, telescoping uprights mounted for relative vertical movement in said pivoted uprights, a hydraulic cylinder between said uprights and having a piston rod vertically movable therebetween, means connected with said piston rod for raising said telescoping uprights upon upward movement of said rod, and a lost-motion connection between said telescoping uprights and said rod for moving said uprights downwardly upon downward movement of said rod.

2. In combination, a pair of laterally spaced channel-shaped uprights, a second pair of uprights having telescoping movement within said first pair of uprights and connected together at their upper ends by a cross member, a hydraulically actuated cross-head movable vertically within said uprights and having abutment means for engaging said cross member upon upward movement of the cross-head to thereby raise said telescoping pair of uprights with respect to said first pair of uprights, and a lost-motion connection between said cross-head and said cross member for moving said second pair of uprights downwardly upon predetermined downward movement of said cross-head.

3. In an industrial truck, a pair of channel-shaped uprights, a second pair of channel-shaped uprights mounted for telescoping movement in said first pair of uprights and having a cross bar at the upper end thereof, a load-supporting carriage having rollers mounted for movement within said second pair of uprights, a hydraulic cylinder between said uprights, a cross-head projecting above and actuated from said cylinder and having means for raising and lowering said carriage relative to said uprights, and abutment means on said cross-head adapted to engage said cross-bar of said second pair of uprights upon upward movement of said cross-head to produce simultaneous raising movement of said second pair of uprights and relative vertical movement of said carriage therein upon upward movement of the cross-head.

4. An industrial truck including a pair of channel shaped uprights pivotally mounted at one end thereof, a second pair of uprights telescoping in said first pair of uprights, a cylinder between said uprights having a piston provided with a cross head, a load supporting carriage guided in said second pair of uprights, tension members anchored to said first pair of uprights and trained over said cross head for connection to said carriage, means for admititng fluid under pressure to said cylinder for raising said cross head to move said carriage vertically relative to said telescoping uprights, and abutment means between said cross-head and said telescoping uprights for engaging said telescoping uprights upon predetermined upward movement of said cross-head to thereby raise said telescoping uprights conjointly with said cross-head while said tension members simultaneously raise said carriage relative thereto.

5. Load raising means for an industrial truck of the class described comprising a first pair of uprights pivotally mounted on said truck at the lower ends thereof, a second pair of uprights guided for vertical movement in said first pair of uprights, hydraulic means for tilting said first pair of uprights about their pivots, a load supporting carriage guided in said second pair of uprights, hydraulic means supported between the lower ends of said first pair of uprights including a vertically movable crosshead, means actuated by said crosshead for raising said carriage, and abutment means engaged by said crosshead upon predetermined upward movement thereof for raising said second pair of uprights whereby said carriage may be moved to the upper end of the extended pair of uprights.

6. The combination of claim 5 further characterized in means actuated automatically upon said crosshead reaching its upper limiting position for deactuating said hydraulic means and holding said crosshead in extended position.

7. Load raising means for an industrial truck of the class described comprising a first pair of uprights pivotally mounted on the truck at the lower ends thereof, a second pair of uprights guided for vertical movement in said first pair of uprights, hydraulic means for tilting said first pair of uprights about their pivots, a load-supporting carriage guided in said second pair of uprights, hydraulic means supported between the lower ends of said first pair of uprights, including a verticaly movable cross-head, means actuated by said cross-head for raising said carriage, means engaged by said cross-head for raising said second pair of uprights, whereby said carriage may be moved to the upper end of the extended pair of uprights, and independent control means for each of said hydraulic means including means automatically operable to return either of said control means to inoperative position when the corresponding hydraulic means reaches predetermined limiting positions.

8. In combination, in an industrial truck having a driving axle assembly and wheeled support at one end thereof, a pair of facing channel shaped uprights pivoted at their lower ends about the axis of the wheeled support, a second pair of facing channel shaped uprights guided vertically within said first pair of uprights, a load supporting carriage having rollers guiding the same for vertical movement in said second pair of uprights, a vertically extending hydraulic cylinder supported at its lower end between said first pair of uprights, means for supplying fluid under pressure to said cylinder, a piston therein having a crosshead, spaced abutment means engaging between said crosshead and second pair of uprights for raising said uprights upon predetermined upward movement of said crosshead, tension members anchored at one end to said first pair of uprights and at the opposite end to said carriage and trained over said crosshead for raising said carriage relative to said second pair of uprights upon raising of said cross head, and a lost motion connection between said abutment means for pulling said second set of uprights downwardly upon predetermined downward movement of said crosshead from its upper limiting position.

ELMER J. DUNHAM.